United States Patent

Raffetto et al.

[11] Patent Number: 5,973,879
[45] Date of Patent: Oct. 26, 1999

[54] RADIALLY LOADED DISC MOUNTING SYSTEM FOR A DISC DRIVE

[75] Inventors: Michael John Raffetto, Scotts Valley; Frederick Frank Kazmierczak, San Jose, both of Calif.

[73] Assignee: Seagate Technology, Inc., Scotts Valley, Calif.

[21] Appl. No.: 08/931,344

[22] Filed: Sep. 16, 1997

[51] Int. Cl.$^6$ .................................................. G11B 17/08
[52] U.S. Cl. ........................................................ 360/98.08
[58] Field of Search .............................. 360/106, 98.08, 360/99.08

[56] References Cited

U.S. PATENT DOCUMENTS

| | | | |
|---|---|---|---|
| 4,555,189 | 11/1985 | Donkin | 384/493 |
| 5,105,322 | 4/1992 | Steltzer | 360/106 |
| 5,436,775 | 7/1995 | Ishimatsu | 360/98.08 |
| 5,497,281 | 3/1996 | Jewell et al. | 360/98.08 |
| 5,731,927 | 3/1998 | Kaneko | 360/98.08 |
| 5,768,060 | 6/1998 | Albrecht et al. | 360/106 |

FOREIGN PATENT DOCUMENTS

| | | | |
|---|---|---|---|
| 62-8357 | 1/1987 | Japan | 360/89.08 |
| 3-113882 | 5/1991 | Japan | 360/98.08 |
| 4-139677 | 5/1992 | Japan | 360/98.08 |

*Primary Examiner*—Allen T. Cao
*Attorney, Agent, or Firm*—Edward P. Heller, III; Raghunath S. Minisandram

[57] ABSTRACT

A disc mounting system for mounting the discs of a disc drive in a fixed radial relationship to the hub of a spindle motor. The disc mounting system includes one or more axially-extending tubular members inserted radially between the outer diameter of the spindle motor hub and the inner diameter of the discs. Various mechanisms for ensuring a tight radial connection between the spindle motor hub and the discs are disclosed.

16 Claims, 6 Drawing Sheets

RADIALLY LOADED DISC MOUNTING SYSTEM FOR A DISC DRIVE

FIELD OF THE INVENTION

This invention relates generally to the field of hard disc drive data storage devices, and more particularly, but not by way of limitation, to a new system for mounting the discs to the hub of a spindle motor in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued Jun. 18, 1996, U.S. Pat. No. 5,517,376, issued May 14, 1996, U.S. Pat. No. 5,452,157, issued Sep. 19, 1995, U.S. Pat. No. 5,333,080, issued Jul. 26, 1994, U.S. Pat. No. 5,274,517, issued Dec. 28, 1993 and U.S. Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

Furthermore, the amount of non-operating mechanical shock which the disc drive is specified to withstand is constantly being increased, with future disc drive products being considered which must be capable of operating after experiencing non-operating mechanical shocks in the range of 1000 G.

In light of these facts, it is clear that the currently common practice of axially loading the disc stack to prevent shifting of the discs relative to the spindle motor hub has nearly reached its maximum useful extreme, and a new system for mounting the discs to the spindle motor hub must be provided.

SUMMARY OF THE INVENTION

The present invention is a disc mounting system for mounting the discs of a disc drive in a fixed radial relationship to the hub of a spindle motor. The disc mounting system includes one or more axially-extending tubular members inserted radially between the outer diameter of the spindle motor hub and the inner diameter of the discs. Various mechanisms for ensuring a tight radial connection between the spindle motor hub and the discs are disclosed.

It is an object of the present invention to provide a system for mounting the discs in a disc stack to the hub of a spindle motor used to rotate the discs in a disc drive.

It is another object of the invention to provide a disc mounting system which prevents shifting of the discs relative to the hub of the spindle motor due to differential thermal expansion.

It is another object of the invention to provide a disc mounting system which prevents shifting of the discs relative to the hub of the spindle motor due to the applications of large mechanical shocks.

It is another object of the invention to provide a disc mounting system that is suitable for use in a high volume manufacturing operation.

It is another object of the invention to provide a disc mounting system that can be implemented in a high volume manufacturing operation in an economical manner.

The manner in which these objects are achieved, as well as other features and benefits of the invention, can best be understood by a review of the following DETAILED DESCRIPTION OF THE INVENTION, when read in conjunction with an examination of the accompanying drawings.

BRIEF DESCRIPTION OF THE DRAWINGS

FIGS. 2-1 and 2-2 are simplified sectional elevation views of typical prior art disc mounting systems which utilize only axial loading to secure the discs.

FIGS. 6-1 and 6-2 are sectional elevation views of two variations of a second embodiment of the present invention.

DETAILED DESCRIPTION OF THE INVENTION

Figure 1:
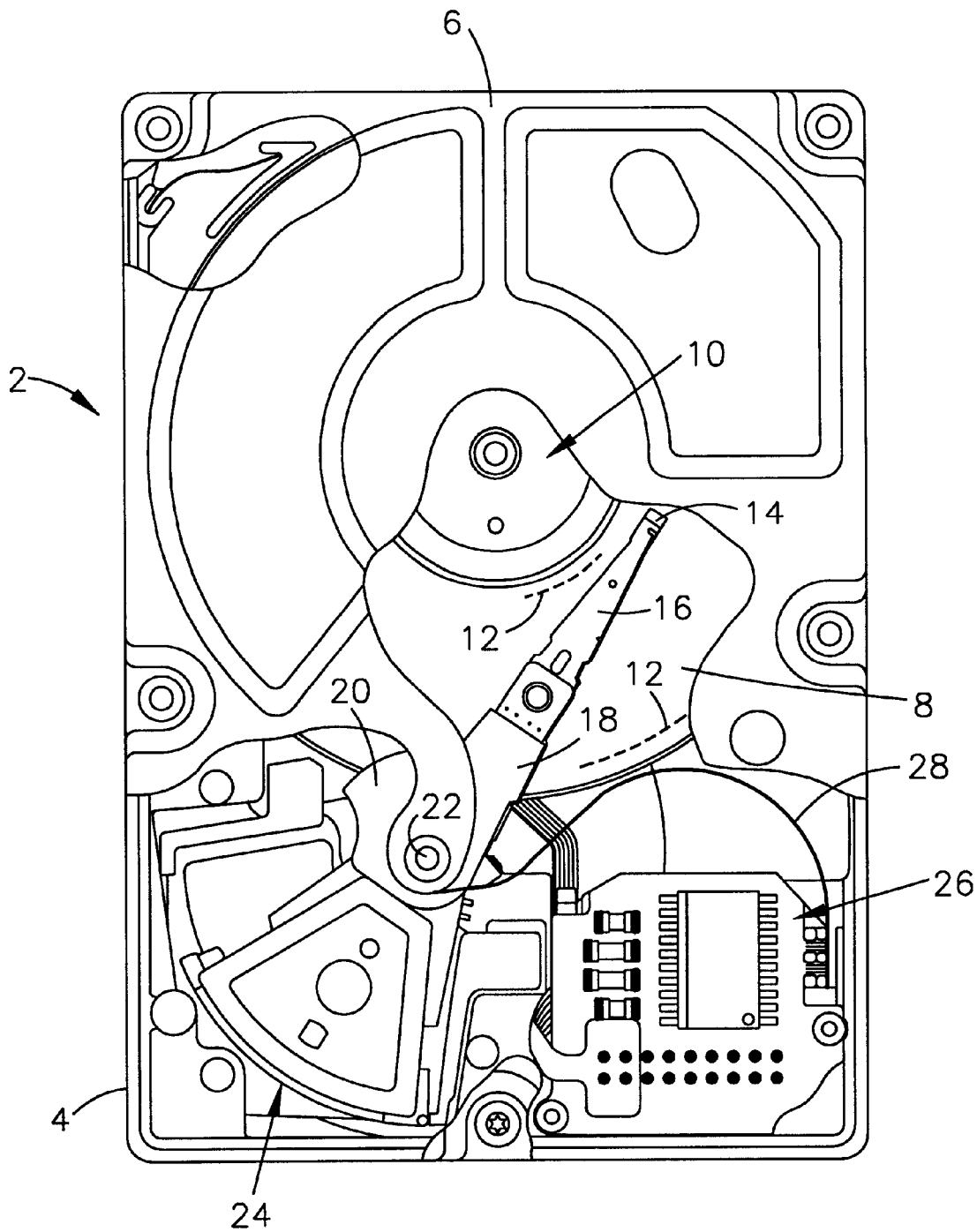
FIG. 1 is a top plan view of a prior art disc drive in which the present invention is particularly useful.

Turning now the drawings and specifically to FIG. 1, shown is a plan view of a disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting, arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

Figures 1, 2:
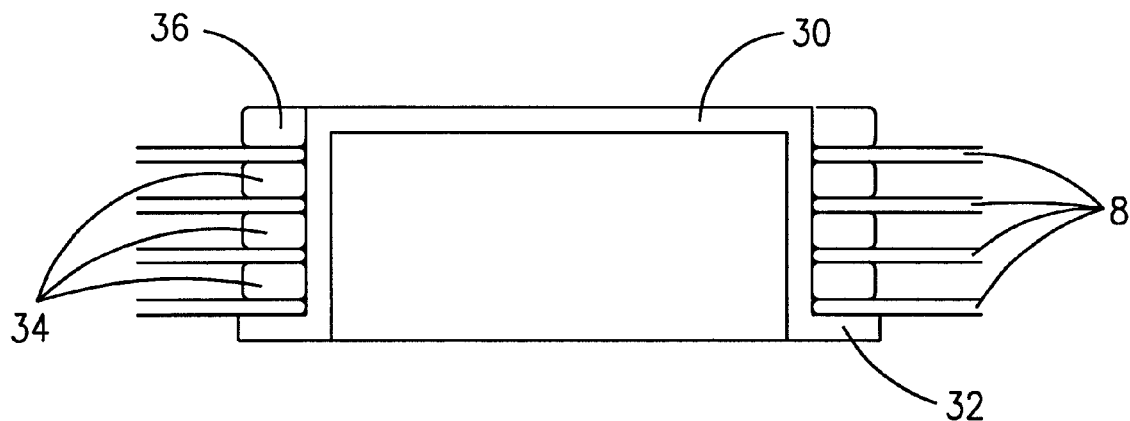
Figure 2:
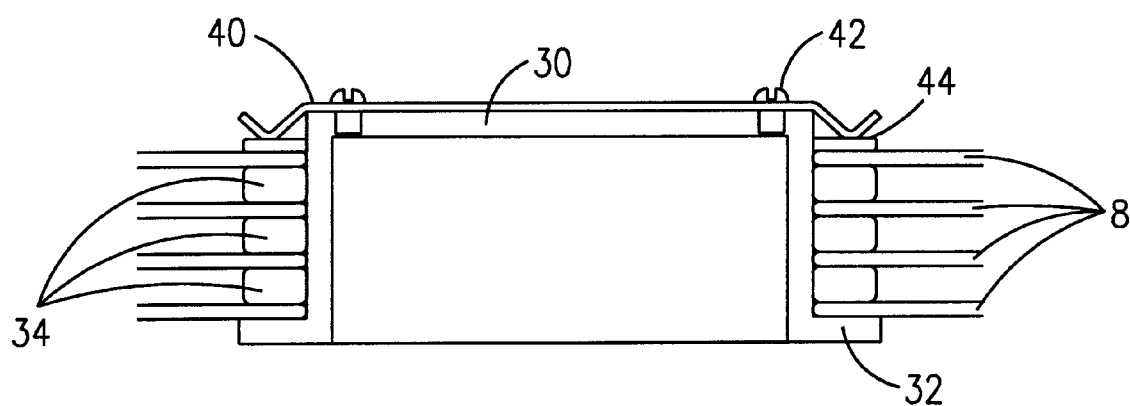

FIG. 2-1 is a simplified sectional elevation view of a typical prior art disc mounting system which utilizes axial loading to secure the discs. The figure shows a hub 30 of a spindle motor having a radially extending disc mounting flange 32 at its lower extreme. The hub 30 is substantially cup-shaped, being closed at the upper end and open at the lower end. The person of skill in the art will appreciate that the electrical and magnetic components (not shown) to rotate the hub 30 would typically be located within the hub.

FIG. 2-1 also shows a plurality of discs 8 and disc spacers 34. The disc stack is assembled by placing a first disc 8 over the hub 30 to rest against the disc mounting flange 32. The stack is formed by then alternately placing disc spacers 34 and discs 8 over the hub until the intended number of discs 8 have been positioned. A disc clamp 36 is then assembled to the uppermost portion of the hub 30 to complete the assembly. While the figure shows an example disc stack which includes four discs, the person of skill in the art will appreciate that the scope of the present invention includes disc stacks having both greater and lesser numbers of discs.

In FIG. 2-1, the disc clamp 36 is of the type referred to in the industry as a "shrink-fit" clamp. Such clamps have an inner diameter that is nominally smaller than the outer diameter of the hub 30. Assembly is accomplished by heating the clamp 36 to cause thermal expansion great enough to allow the clamp 36 to pass over the hub 30. The designed amount of axial loading is then applied to the disc clamp 36 and the clamp 36 is allowed to cool and shrink into interference fit with the hub 30.

Turning now to FIG. 2-2, shown is a simplified diagrammatic sectional elevation view, similar to that of FIG. 2-1, showing a second prior art disc clamping system. FIG. 2-2 shows a spindle motor hub 30 incorporating a disc mounting flange 32 similar to that shown in FIG. 2-1, and a stack of discs 8 and disc spacers 34, also similar to those of FIG. 2-1.

FIG. 2-2 shows a disc clamp 40 of the type known in the industry as a "spring clamp". Such spring disc clamps 40 are typically formed from flat sheet stock having the desired spring characteristics and include circumferential corrugations closely adjacent the outer diameter of the disc clamp which form a contact surface (not designated) for exerting force to the disc stack when a plurality of screws 42 are assembled through the disc clamp 40 into threaded holes (also not designated) in the hub 30. It is also typical for disc clamping systems incorporating such spring disc clamps 40 to include a washer member 44 between the contact surface of the disc clamp 40 and the upper surface of the uppermost disc 8. This washer member 44 aids in evenly distributing the clamping force of the disc clamp 40 about the circumference of the mounting portion of the discs 8 and allows for slip contact between the contact surface of the disc clamp 40 and the washer member 44 when the screws 42 are tightened, thus preventing the exertion of radial stresses directly to the uppermost disc 8.

Selection of the material and geometry of the disc clamp 40 will determine the amount of axial clamping force exerted by the disc clamping system of FIG. 2-2, as will be appreciated by persons of skill in the art. Details of typical disc clamping systems incorporating a spring clamp such as that of FIG. 2-2 can be found in previously incorporated U.S. Pat. Nos. 5,274,517 and 5,295,030.

Both of these two prior art disc clamping systems share a common drawback. Specifically, since the inner diameter of the discs must be at least slightly larger than the outerdiameter of the spindle motor hub to allow for assembly ease, the discs are subject to radial displacement relative to the spindle motor hub after assembly due to differential thermal expansion and applied mechanical shocks. And, since all clamnping forces applied to the disc stack are in the axial direction, all resistance to such radial shifting of the discs relative to the spindle motor hub is, therefore, purely a function of the amount of applied axial force and the coefficient of friction of the disc stack components. As previously noted hereinabove, with the continuing market trend for higher and higher mechanical shock tolerances, such purely axially loaded disc mounting systems are becoming unsatisfactory.

Throughout the ensuing discussions of the remaining Figures, examples of several embodiments of the present invention will be explained. The example embodiments will be explained using example implementations that include specific numbers of disc stack components, such as discs and disc spacers. It will be apparent to one of skill in the art that these examples are for illustrative and explanatory purposes, and that the particular number of various components should not be considered as limiting to the scope of the present invention.

Figure 3:
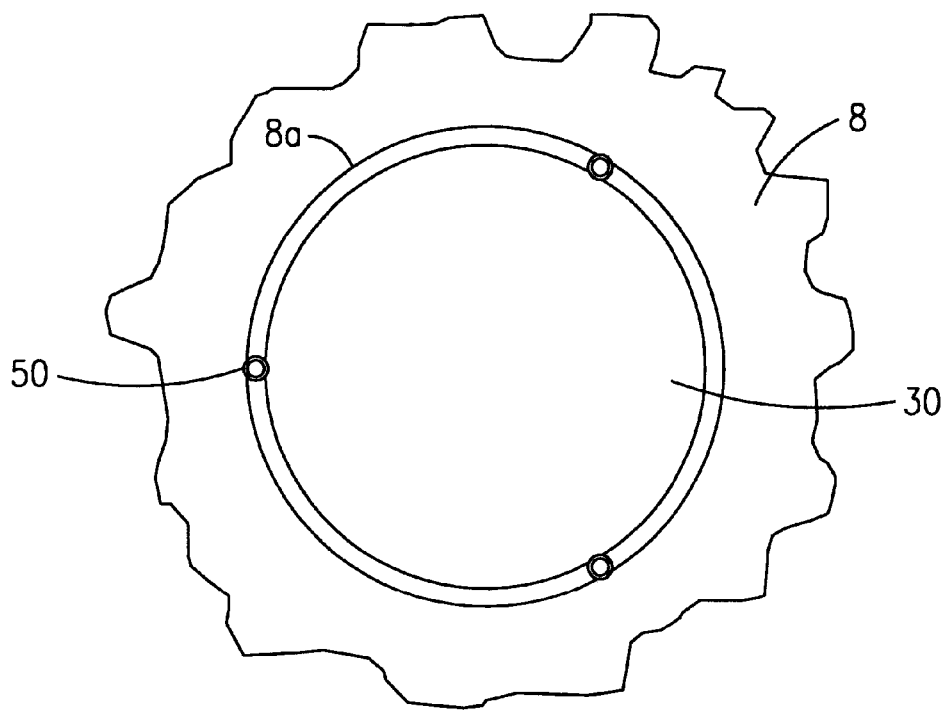
FIG. 3 is a plan view of a first embodiment of the present invention.

FIG. 3 is a plan view of components comprising a first embodiment of the present invention. The Figure shows the inner portion of a disc 8, including the inner diameter 8a of the disc 8.

Also shown in FIG. 3 is the hub 30 of a spindle motor, such at that shown in the prior art of FIGS. 2-1 and 2-2. As can be seen in the Figure, the outer diameter of the spindle motor hub 30 is smaller than the inner diameter 8a of the disc 8. The radial spacing between the inner diameter 8a of the disc 8 and the outer diameter of the spindle motor hub 30 is taken up by one or more axially-extending tubular members 50 inserted between the disc 8 and the spindle motor hub 30. While FIG. 3 shows three tubular members 50 spaced 120 degrees apart about the circumference of the spindle motor hub 30, it is considered that implementations of the present invention which include both greater and lesser numbers of tubular members 50 are encompassed by the scope of the present invention.

It is presently envisioned that the outer diameter of the tubular members 50 is selected to be slightly larger than the nominal radial spacing between the disc 8 and the spindle motor hub 30, and that the tubular members 50 are fabricated from a material having sufficient spring characteristic to deform radially when the disc 8 is pressed axially downward onto the spindle motor hub 30, and then return to substantially their original dimension in those locations not radially adjacent the disc 8. The effect of this mounting of the disc 8 to the spindle motor hub 30 is best seen in FIG. 4.

Figure 4:
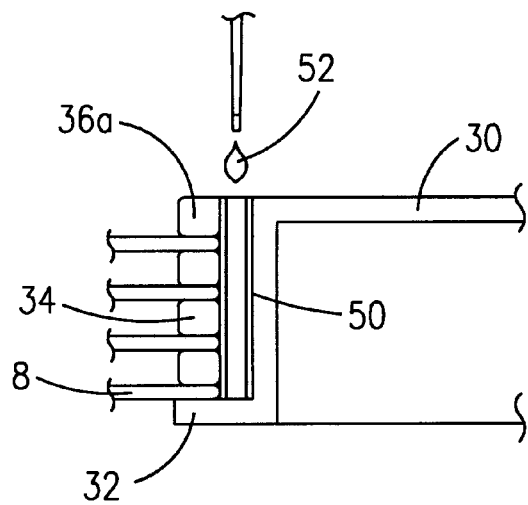
FIG. 4 is a sectional elevation view of the first embodiment of the present invention.

FIG. 4 is a sectional elevation view of a disc stack assembled in accordance with the first embodiment of the present invention. The sectional view is taken through one of the tubular members 50, and shows that the tubular member 50 extends axially along the entire axial length of the spindle motor hub 30. The spindle motor hub 30 includes a radially extending disc mounting flange 32, on which the lowermost disc 8 is brought to rest. As presently envisioned, when the discs 8 are placed over the spindle motor hub 30 and tubular members 50 and pressed to their desired axial positions, an interference fit is formed between the inner diameter of the discs (8a in FIG. 3) and the tubular members 50. Adjacent discs 8 in the disc stack are axially separated by an appropriate number of disc spacers 34, which can also optionally form an interference fit at their inner diameters with the tubular members 50. Once the entire array of discs 8 and disc spacers 34 have been located on the spindle motor hub 30, a disc clamp 36a is attached to the upper portion of the spindle motor hub 30 to maintain the axial position of the discs 8 relative to the spindle motor hub 30. The specific configuration of an example disc clamp 36a can be seen in FIG. 5.

Figure 5:
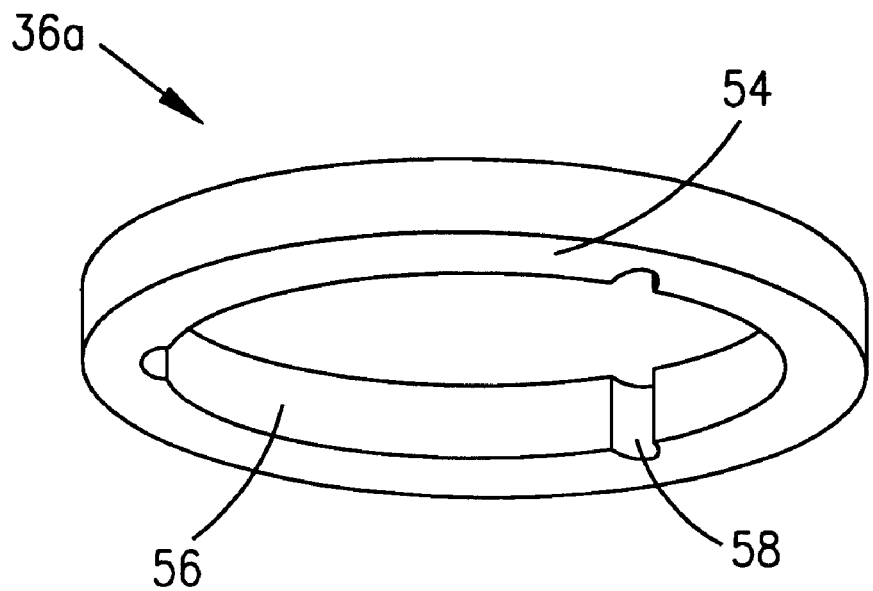
FIG. 5 is a bottom perspective view of a disc clamp which is a portion of a possible embodiment of the present invention.

FIG. 5 is a bottom perspective view of a shrink-fit disc clamp 36a, such as that shown in FIG. 4. In the figure, it can be seen that the disc clamp 36a includes a disc contact surface 54 which contacts the upper surface of the uppermost disc in the disc stack. The disc clamp 36a also includes an inner diameter 56 which is dimensioned to be nominally smaller than the outer diameter of the spindle motor hub. Assembly of the disc clamp 36a to the spindle motor hub is accomplished by heating and expanding the disc clamp 36a, positioning the disc clamp over the spindle motor hub in contact with the uppermost disc in the disc stack, and allowing the disc clamp 36a to cool and contract, until the inner diameter 56 of the disc clamp 36a is in firm contact with the outer diameter of the spindle motor hub.

FIG. 5 shows that the disc clamp 36a also includes a plurality of relief features 58, intended to allow clearance for the tubular members (50 in FIGS. 3 and 4). Once again, FIG. 5 shows a disc clamp 36a with three relief features 58 for use with three tubular members 50 as shown in FIG. 3, but the specific number of tubular members 50, and thus relief features 58, is not considered as limiting to the scope of the present invention.

Returning now to FIG. 4, a final aspect of the first embodiment of the present invention is shown. Because, as was previously mentioned, the tubular members 50 are envisioned to have spring characteristics to allow the discs 8 to be pressed over the spindle motor hub 30, the static radial position of the discs 8 relative to the spindle motor hub 30 is established. However, in the presence of mechanical shocks applied in a vector normal to the spin axis of the disc stack, the spring characteristics of the tubular members 50 may allow the discs 8 to shift radially relative to the spindle motor hub 30. It is therefore envisioned that epoxy, or other fast-hardening liquid or viscous material, 52 will be injected into the tubular members 50 and allowed to cure. Once the epoxy 52 has hardened, the tubular members 50 with the cured epoxy 52 inside will act more as solid rods than as hollow tubes, thus ensuring that the radial position of the discs 8 relative to the spindle motor hub 30 cannot be effected by applied mechanical shocks.

From the foregoing discussion, it is apparent that the disc mounting system of FIG. 4 provides radial constraint of the discs 8 relative to the spindle motor hub 30 through the tubular members 50. Therefore, the disc clamp 36a is responsible only for maintaining the axial relationship of the disc stack components, and can thus be optimized for this function, without concern for providing a large enough axial load to prevent radial shifting of the discs, as was the case with the prior art disc mounting systems of FIGS. 2-1 and 2-2. A person of skill in the art will also appreciate that a spring-type disc clamp, such as the disc clamp 40 of FIG. 2-2, could be utilized with the tubular members 50 of the present invention without exceeding the scope of the present invention. Once again, such a spring-type disc clamp would only be responsible for maintaining the axial relationship of the disc stack components, and can be optimized for this purpose.

In another aspect of the present invention, it is envisioned that the tubular members 50 used to radially load the discs 8 relative to the spindle motor hub are to fabricated from a shape-memory alloy (SMA). SMAs are well known in the industry, and are typically characterized by having two distinct crystalline states or phases, each of which is achieved at specific temperatures dependent on the exact alloy composition and the fabrication processes used in the manufacture of components. The first of these two phases, the martensitic phase, is characterized by occurring at a lower temperature range than the second, or austenitic, phase. The martensitic phase is also typically "weaker" or more malleable than the austenitic phase. The austenitic phase is sometimes referred to as the "trained" phase. If a SMA component is formed to a particular shape and heated to a transition temperature (dependent upon alloy composition) while held in that shape, the component forms with a "memory" of that shape. When allowed to cool, the material switches to the martensitic phase, and can be bent or deformed with relative ease. If the component is then heated to an activation temperature (again dependent on alloy composition), the component again transforms to its austenitic phase, and recovers the shape in which it was originally "trained". This phase and shape change is accomplished with a high level of force.

The applicability of SMAs to the present invention relates to the fabrication of the tubular members 50. If the tubular members 50 are formed and trained with a diameter selected to provide the desired radial contact between the spindle motor hub and the inner diameter of the discs, and then allowed to cool, they can be mechanically flattened. In such condition, the tubular members will allow the discs to be readily placed over the hub of the spindle motor without the use of press-fitting. Once the discs are positioned at their desired axial locations relative to the spindle motor hub, the tubular members are heated to their activation temperature, and will recover their "memorized" shape. As the tubular members reassume their original shape, the outer surfaces of the tubular members will contact the inner diameter of the discs and the outer diameter of the spindle motor hub, thus establishing a fixed radial loading of the discs relative to the spindle motor hub. If the tubular members are not fractured during the flattening process, the restoration of the tubular shape will occur with a high amount of force. Adequate engineering considerations to nominal dimensions of components and dimensional tolerances must, therefore, be taken to ensure that the forces applied to the discs do not result in distortion or breakage of the discs.

Figures 1, 6:
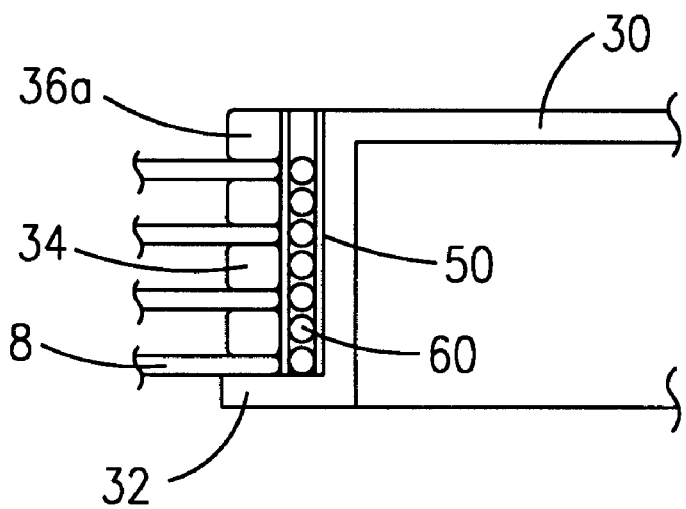
Figures 2, 6:
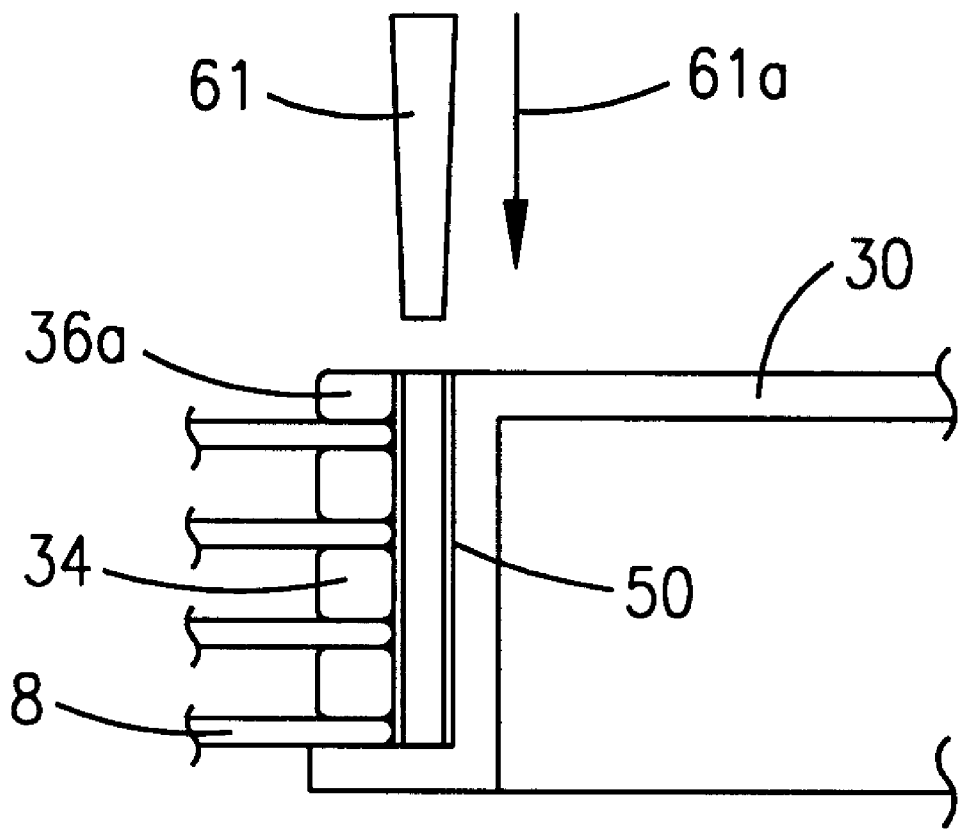

FIG. 6-1 shows a sectional elevation view, similar to that of FIG. 4, of a first variation of a second embodiment of the disc mounting system of the present invention. FIG. 6-1 again shows a spindle motor hub 30 with a radially extending disc mounting flange 32 near its lower end. A plurality of discs 8 and disc spacers 34 have been placed over the spindle motor hub 30 with the inner diameters of the discs 8 in interference fit with axially extending tubular members 50, all in a manner similar to that previously described in relationship to the first embodiment of FIG. 4.

In the second embodiment of FIG. 6-1, however, a plurality of ball elements 60 are pressed axially into the tubular members 50 to axial positions lying opposite the discs 8, and, optionally, the disc spacers 34. These ball elements 60 completely take up the inner diameter of the tubular members 50 and thus provide a rigid radial positioning of the discs 8 relative to the spindle motor hub 30. The lowermost ball element 60 is installed first, with each subsequent ball element 60 being axially positioned through the use of assembly tooling (not shown). In practice, it is envisioned that each of the ball elements 60 will have a diameter slightly larger than the ball element immediately below it, to ensure that cold-flowing of the material of the tubular members 50 during insertion of preceding ball elements 60 does not result in a loose fit between the ball element 60 and the inner wall of the tubular elements 50.

Finally, a disc clamp 36a is mounted to the upper portion of the spindle motor hub 30 to provide axial constraint of the disc stack components. The disc clamp 36a can be a shrink-fit type, such as that described above in relationship to FIG. 5, or a spring-type clamp, such as the disc clamp 40 described above in relationship to the prior art disc mounting system of FIG. 2-2. Whatever type of disc clamp is utilized, it should be noted that the disc clamp can be optimized to provide only the necessary amount of clamping force to satisfy the vertical axis mechanical shock specification, since radial positioning of the discs 8 relative to the spindle motor hub 30 is provided by the tubular members 50.

FIG. 6-2 shows an alternative implementation of this embodiment of the present invention, in which the plurality of ball elements (60 in FIG. 6-1) are replaced by a single tapered pin element 61 pressed into each tubular element 50 in the direction shown by arrow 61a. It is envisioned that the tapered pin element 61 will have its smallest diameter at the lower end of the tubular member 50 and its largest end near the top of the tubular member 50, and that the diameter of the tapered pin element 61 will increase by an amount on the order of two milli-inches (0.002 inch) in the axial distance from one disc 8 to the next higher disc 8 in the disc stack. The amount of taper is greatly exaggerated in FIG. 6-2 for illustrative purposes. As the tapered pin element 61 is pressed downward through the tubular members 50, the diameter of the tubular members 50 will be increased, bringing the discs 8 into firm contact, through the tubular members 50 and tapered pin elements 61, with the spindle motor hub 30. Again, some type of disc clamp 36a is used to establish axial loading of the disc stack components.

Figure 7:
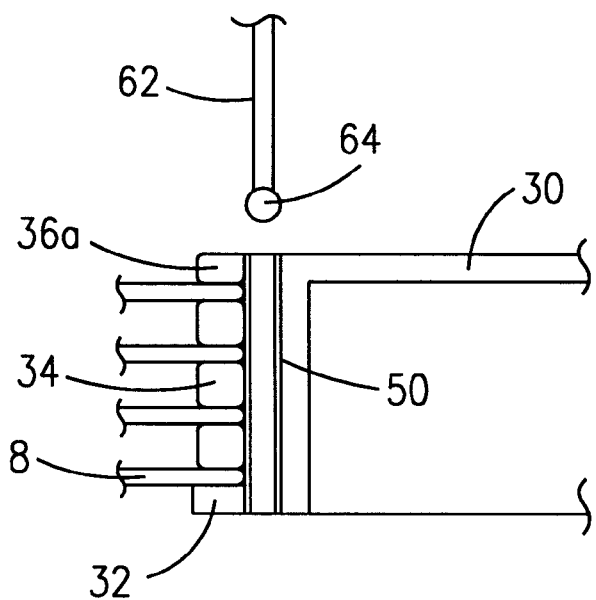
FIG. 7 is a sectional elevation view of a third embodiment of the present invention.

FIG. 7 is a sectional elevation view, similar to those of FIGS. 4 and 6, illustrating a disc stack assembled in accordance with a third embodiment of the present invention. Once again, the disc stack includes a spindle motor hub 30 with a radially extending disc mounting flange 32 at its lower end. The disc stack is made up of a number of discs 8 and disc spacers 34, and is axially fixed by a disc clamp 36a, similar to that of FIG. 5. The scope of the invention is not considered as limited by the particular number of discs 8, disc spacers 34 or the type of disc clamp 36a included in the disc stack, nor by the number of tubular members 50.

The embodiment of FIG. 7 includes tubular members 50 over which the discs 8, and optionally the disc spacers 34, are lightly press fitted. An assembly tool 62, including a ball end 64, is then forced axially through the tubular member 50. The ball end 64 of the assembly tool 62 has an outer diameter which is slightly larger than the inner diameter of the tubular member 50. As the assembly tool passes through the tubular member 50, interference between the ball end 64 and the inner surface of the tubular member 50 causes cold flowing of the material of the tubular member 50, in particular in the area of the bevels commonly found at the inner diameter of the discs 8 and the disc spacers 34. The result of this cold-flowing of the material of the tubular member 50 is best seen in FIG. 8.

Figure 8:
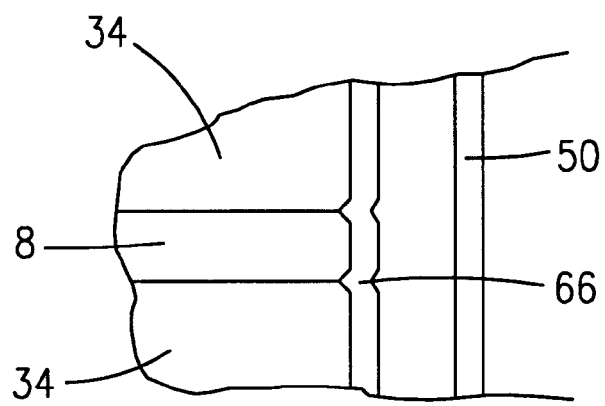
FIG. 8 is a detail view of a portion of the third embodiment of the present invention.

FIG. 8 is a detail sectional elevation view of a single disc 8 captured between two disc spacers 34. In the figure, it can be seen that the material of the tubular member 50 has cold-flowed in the region 66 of the bevels (not designated) provided for assembly ease on the disc 8 and the disc spacers 34. The cold-flowed material of the tubular member 50 substantially fills the radial space formed by the bevels in the disc 8 and disc spacers 34, and further causes direct contact between the inner diameter of the disc 8 and the tubular member 50.

The cold-flowing of the material of the tubular member 50 caused by passage of the assembly tool 62 through the tubular member thus provides both radial and axial support of the disc 8, and, as a consequence, not only prevents radial shifting of the disc 8 relative to the spindle motor hub 30, but contributes to maintenance of the axial position of the disc 8 relative to the spindle motor hub 30. Since the disc 8 is axially constrained by the cold-flowed material of the tubular member 50, the amount of axial clamping force which must be provided by the disc clamp (36a in FIG. 7) is comparably reduced, lessening the probability that axial clamping forces can mechanically distort the discs 8 in the disc stack.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A disc drive including one or more discs mounted to a hub of a spindle motor and a disc mounting system for mounting the discs to the spindle motor hub comprising:

a radially extending disc mounting flange at the lower end of the spindle motor hub;

one or more disc spacers interposed between adjacent discs;

a disc clamp fixedly attached to the upper end of the spindle motor hub for exerting an axial loading force through the discs and disc clamps to the disc mounting flange; and one or more axially-extending tubular members radially interposed between the inner diameters of the discs and the spindle motor hub.

2. A disc drive as claimed in claim 1, wherein the tubular members are filled with a hardening material.

3. A disc drive as claimed in claim 2 wherein the hardening material is an epoxy.

4. A disc drive as claimed in claim 1 including ball elements pressed into the tubular members to axial locations opposite each of the discs.

5. A disc drive as claimed in claim 4 including ball elements pressed into the tubular members to axial locations opposite each of the disc spacers.

6. A disc drive as claimed in claim 1 including ball elements pressed into the tubular members to axial locations opposite each of the discs and disc spacers.

7. A disc drive as claimed in claim 1 including a tapered pin element pressed into each of the tubular members.

8. A disc drive as claimed in claim 1 wherein an assembly tool including a ball end is pressed through the tubular members causing cold-flowing of the material of the tubular members to provide both radial and axial positioning of the discs relative to the spindle motor hub.

9. A disc clamping system for mounting one or more discs to a hub of a spindle motor in a disc drive, the disc mounting system comprising:

a radially extending disc mounting flange at the lower end of the spindle motor hub;

one or more disc spacers interposed between adjacent discs;

a disc clamp fixedly attached to the upper end of the spindle motor hub for exerting an axial loading force through the discs and disc clamps to the disc mounting flange; and one or more axially-extending tubular members radially interposed between the inner diameters of the discs and the spindle motor hub.

10. A disc clamping system as claimed in claim 9 wherein the tubular members are filled with a hardening material.

11. A disc clamping system as claimed in claim 10 wherein the hardening material is an epoxy.

12. A disc clamping system as claimed in claim 9 including ball elements pressed into the tubular members to axial locations opposite each of the discs.

13. A disc clamping system as claimed in claim 12 including ball elements pressed into the tubular members to axial locations opposite each of the disc spacers.

14. A disc clamping system as claimed in claim 9 including ball elements pressed into the tubular members to axial locations opposite each of the discs and disc spacers.

15. A disc clamping system as claimed in claim 9 including a tapered pin element pressed into each of the tubular members.

16. A disc clamping system as claimed in claim 9 wherein an assembly tool including a ball end is pressed through the tubular members causing cold-flowing of the material of the tubular members to provide both radial and axial positioning of the discs relative to the spindle motor hub.

* * * * *